United States Patent
Luik

(10) Patent No.: US 6,694,797 B2
(45) Date of Patent: Feb. 24, 2004

(54) DIAL INDICATOR CALIBRATION APPARATUS

(76) Inventor: Ilmar Luik, 169 Bolling Rd., Meridianville, AL (US) 35759

( * ) Notice: Subject to any disclaimer, the term of this patent is extended or adjusted under 35 U.S.C. 154(b) by 256 days.

(21) Appl. No.: 09/853,144

(22) Filed: May 10, 2001

(65) Prior Publication Data

US 2002/0019718 A1 Feb. 14, 2002

Related U.S. Application Data

(60) Provisional application No. 60/202,709, filed on May 10, 2000.

(51) Int. Cl.[7] .............................................. G01B 21/00
(52) U.S. Cl. ......................................... 73/1.79; 73/1.81
(58) Field of Search ................................ 73/1.75, 1.79, 73/1.81

(56) References Cited

U.S. PATENT DOCUMENTS 3,496,758 A  *  2/1970  Sunnen ........................ 73/1.81
6,062,062 A  *  5/2000  Toida et al. ................... 73/1.81

FOREIGN PATENT DOCUMENTS

DE          000956174 A  *  1/1957 .................. 73/1.81

* cited by examiner

Primary Examiner—Robert Raevis
(74) Attorney, Agent, or Firm—Mark Clodfelter

(57) ABSTRACT

Calibration and resolution-determining apparatus for dial indicators is disclosed. In this apparatus, a dial indicator to be tested is rigidly mounted in an upper frame member, with a plunger of the dial indicator bearing against a movable gage block having upper and lower parallel surfaces. A reference indicator of a higher accuracy than the dial indicator under test is mounted to the frame below the gage block, with a plunger thereof bearing against the lower surface thereof. The gage block is mounted to a distortable structure connected to the frame by living hinges so that distortion of the structure causes the gage block to move, causing corresponding movement of the respective plungers of the dial indicator and reference indicator. A readout of the reference indicator may then be compared to a reading on the dial indicator, allowing determination of accuracy and resolution of the instrument under test.

15 Claims, 2 Drawing Sheets

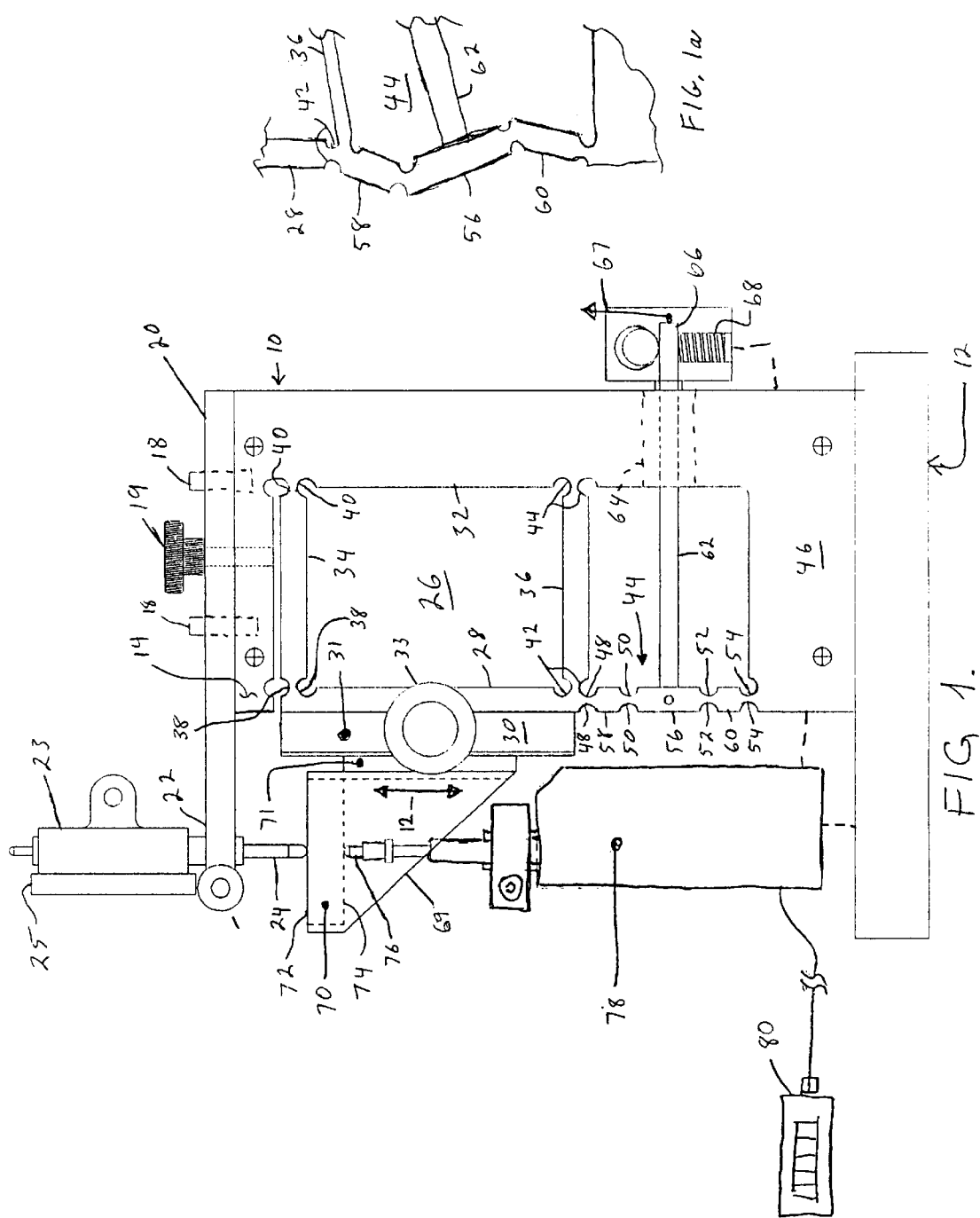

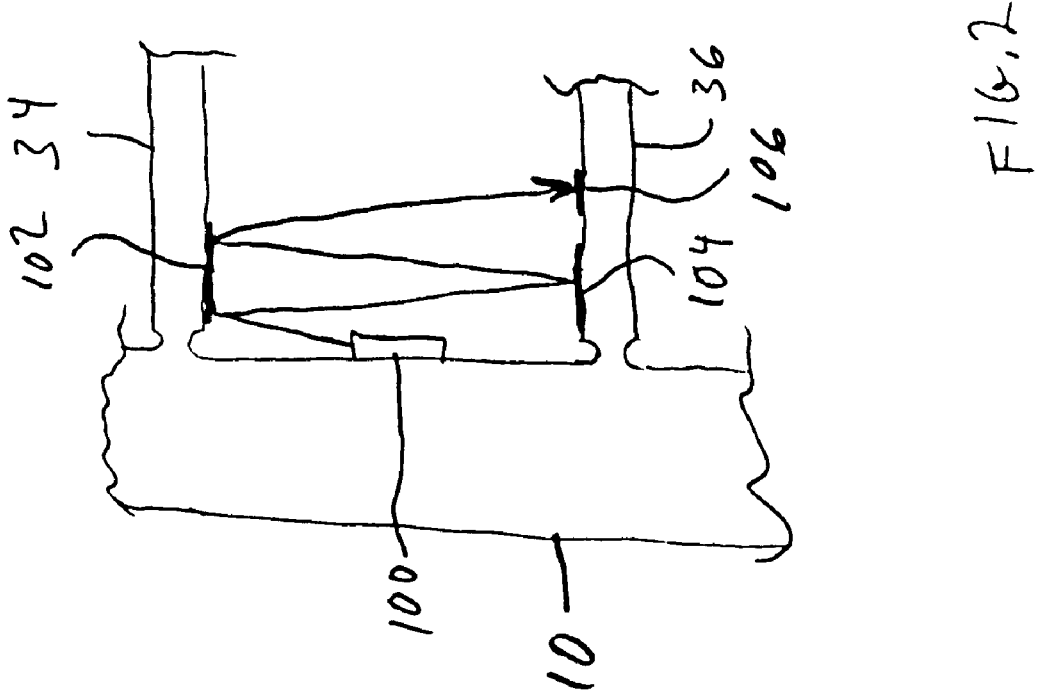

DIAL INDICATOR CALIBRATION APPARATUS

CROSS REFRENCE TO RELATED APPLICATIONS

This application claims the benefit of provisional application No. 60/202,709, filed May 10, 2000.

FIELD OF THE INVENTION

This invention relates to dial indicator calibration devices, and particularly to such a device wherein deflection of a frame weakened at selected points and to which a dial indicator is mounted produces very small linear movements to calibrate and determine limits of resolution of dial indicators.

BACKGROUND OF THE INVENTION

Dial indicators are widely used in a variety of applications and industries, and typically measure distances or lengths in increments down to thousandths or ten thousandths of an inch, or more recently hundredths or thousandths of a millimeter. These indicators typically use a rack, and reduction gears in conjunction with the rack to move a needle across the face of a dial.

Through use, and sometimes mishandling, the gears become worn and develop lash, meaning that a distance-measuring plunger attached to the rack will move a tiny distance before the needle moves. When this occurs, the indicator is no longer accurate, and must either be refurbished, calibrated or thrown away.

One prior art method for determining whether an indicator is worn or in need of calibration or refurbishing is simply though the use of feeler gages. Here, the indicator is mounted in a fixture with the distance-measuring plunger bearing against a reference surface. A bezel ring (provided on most dial indicators) is set so that the current indication of the indicator is zero, and feeler gages of known thicknesses are placed under the plunger. The reading on the indicator is then compared to the known thickness of the particular gage. Problems with this method is the possibility of debris being trapped between the gage and the reference surface. In addition, where a very high degree of accuracy is desired, a cushion of air may become trapped between the gage and reference surface, making the resulting accuracy uncertain.

Accordingly, it is one object of the invention to provide a calibration apparatus to facilitate calibration of dial indicators. It is another object of the invention to provide a calibration apparatus wherein resolution or sensitivity of the indicator may be determined. Other objects and advantages will become apparent upon a reading of the following specification.

SUMMARY OF THE INVENTION

Apparatus for determining resolution of and for calibrating dial indicators is disclosed. A frame having a base is provided with a clamp for mounting a dial indicator to the frame, with a plunger of the dial indicator bearing against a first surface of a selectively movable member. A plunger of a reference indicator against which readings from the dial indicator are compared bears against a second surface of the selectively movable member so that when the selectively movable member is moved, the respective plungers are moved, allowing a comparison between the reference indicator and the dial indicator.

BRIEF DESCRIPTION OF THE DRAWINGS

FIG. 1 is a side view showing construction details of one embodiment of a calibrator of the present invention.

FIG. 1a is an exaggerated view showing operating principles of a calibrator of the present invention.

FIG. 2 is a view showing an alternate embodiment of the present invention.

DETAILED DESCRIPTION OF THE DRAWINGS

Referring to FIGS. 1, 1a and 2, a dial indicator calibration device of the instant invention is shown. In this invention, distortion of a frame weakened at specific points produces minscule, controllable amounts of linear motion which is used to accurately calibrate dial indicators and determine limits of their resolution.

In FIG. 1, a frame 10 is shown that incorporates the structure of the instant invention. This frame may be about 1 inch or so deep in the dimension not shown in FIG. 1, and may be constructed of a metal such as aluminum, which allows thermal expansion and contraction to equilibrate rapidly. The frame may also be constructed of other materials, such as a stainless steel such as INVAR, known to have a very low coefficient of thermal expansion. Frame 10 is rigidly mounted to a base 12, which provides a stable support for the frame. An upper support member 14 extends generally parallel to base 12, and rigidly supports, as by pins 18 and a conveniently removable fastener 19, an arm 20 configured at its distal end 22 to conventionally receive a dial indicator 23 in a rigid relationship with arm 20. While the instant invention is discussed in terms of calibrating a dial indicator, other similar indicators, such as digital indicators, may be calibrated using the instant invention. An opening 23 (dashed lines) in end 22 receives a hollow, circular-in-cross-section portion 25 of the dial indicator, this portion 25 having a distance-measuring plunger extending therethrough. A vertical split (not shown) extends from an end of arm 20 to opening 23. A threaded shaft having a knob 27 extends through a horizontal bore in one side of the split portion, the shaft being threaded into a threaded opening on the other split portion so that turning of knob 27 and the threaded shaft causes opening 23 to clampably engage portion 25 of the dial indicator 23. So mounted, distance-measuring plunger 24 of dial indicator 23 vertically depends as shown from end 22 of arm 20 on the left-hand side of frame 10. For accommodating different configurations of portions 25 of different dial indicators, fastener 19 may be removed and a different arm 20 mounted on support member 14, this different support member having an end specifically configured to receive the particular type of indicator to be mounted thereto.

Positioned beneath member 14 is a generally rectangular (or square) structure or frame 26 constructed of a side support member 28 to which a rack and pinion-type slide adjustment mechanism 30 similar to those found on microscopes is mounted. Mechanism 30 is conventionally constructed having a stationary member 31 mounted to support member 28, the member 31 supporting in vertically movable relation a pinion operated by a wheel 33, and a rack member 71 moved by the pinion. A frictional characteristic is conventionally provided between rack member 71 and the pinion so that when wheel 33 is not being operated, rack member 71 is held stationary by friction. Additionally, a lock may be provided to lock the rack and pinion together.

An inner portion 32 of frame 10 forms a rigid side of structure 26 opposed from side 28. Upper and lower members 34, 36, respectively, form the upper and lower sides of structure 26. The inner and outer corners of structure 26 may be weakened by drilling or radiusing the corners as shown at 38, 40, 42, and 44, forming living hinge-like structures at these areas. Thus, rectangular structure 26 may be deformed such that side support member 28 and the attached adjustment mechanism 30 are moved in vertical directions.

For accomplishing such vertical movement of side support member 28, a pivoting hinge assembly 44 is attached between hinge or corner 42 and a lower portion 46 of frame 10 that is attached to base 12. Hinge 44 is weakened to provide living hinges, again as by radiusing, at points 48, 50, 52, and 54, forming a center hinge member 56 and upper and lower hinge members 58, 60, respectively. A lever arm 62 is rigidly attached to and extends generally perpendicular from center hinge member 56, and, depending on the accuracy desired, through an opening 64 (dashed lines) in base 10. With this construction, there is a direct relationship between the length of lever arm 62 and degree of sensitivity of the calibration device. An opposed end 66 of arm 62 may be connected to any device capable of applying an upward or downward force to end 66 of arm 62, such as a linear motor, force transducer, threaded shaft or a cam member or others. Such force-applying device would typically be mounted to base 46 or intermediate support member 32, and is schematically illustrated. A compression spring 68 may be mounted so as to remove any slack or lash between the end of arm 62 and the force-applying device.

Attached, as by a frame 69 mounted to movable rack member 71, is a block 70 (dashed lines) having an upper surface 72 and a lower surface 74. For enhanced accuracy, block 70 may be constructed of a material selected for an extremely low coefficient of thermal expansion and contraction, such as a ceramic or crystalline material. Surfaces 72 and 74 are also constructed to be parallel to a high degree of accuracy, and may be polished to be flat to a high degree of accuracy. A precision digital reference gage 78 is adjustably mounted (schematically shown), such as by being clamped between two side plates (not shown) attached to base 12 or member 46 below frame 69 and block 70. Digital reference gage 78 may be one of a number of digital gages possessing a high degree of accuracy and manufactured by HEIDEHAIN, such as model number MT 2501, this gage capable of measuring increments of 0.0000002 inches with a total measuring range of 1 inch. With this construction, plunger 24 of gage 23 bears against upper surface 72, and plunger 76 of gage 78 bears against lower surface 74 of block 70. Gage 78 is coupled to a digital readout 80 provided with a sufficient number of digits to accommodate the output and accuracy of gage 78.

In operation, an indicator gage, which may be a mechanical dial indicator or a digital indicator, to be tested or calibrated is mounted to end 22 of an appropriate arm 20. In one method of testing, wheel 33 is rotated to move block 70 such that upper surface 72 just contacts an end of plunger 24. A bezel ring 25 (for the dial indicator) may then be set to "0", and reference gage 78 mounted and positioned so that its plunger is at a point close to its most extreme inward position. At this point, the digital readout from gage 78 may be set to "0" to match the "0" reading of gage 23. Knob 33 may then be rotated to move block 70 upward, simultaneously moving plunger 24 upward into gage 23 and allowing plunger 76 to move out of gage 78. Concurrently, the readout from digital indicator 80 is observed for correspondence with gage 23. Such comparison may be made throughout the entire range of movement of plungers 24 and 76 as effected by rotating knob 27. Where the reading from gage 23 begins to deviate significantly from the readout of readout 80, gage 23 may be calibrated, refurbished or discarded. Significantly, as a test may be made relatively quickly between the reference indicator and the dial indicator being tested, thermal expansion and contraction of the frame and components that are deflected should not be an issue. However, as stated, block 70 may be constructed of a material not affected by thermal expansion and contraction in order to ensure a highest degree of accuracy.

For testing sensitivity, resolution or sensitivity of a particular point in the travel of plunger 24, rotation of knob or wheel 33 is terminated, and where provided the rack and pinion are locked together, and a force from the force-applying device coupled to end 66 of arm 62 is applied to arm 62. Where an upward force is applied to arm 62, as indicated by arrow 67, hinge 44 is distorted as shown in FIG. 1a (shown exaggerated for clarity). Of course, a downward force produces the same downward movement of side 28, but the direction of deflection of components 56, 58 and 60 is in opposite directions. This distortion pulls side 28 and block 70 downward a distance determined by displacement of arm 62. As stated, and in this manner, controlled vertical movement of block 70 in the range of 0.2 millionths of an inch or less is possible. Such miniscule movements may be increased until gage 23 begins to register these movements, thus determining the limits of resolution or sensitivity of gage 23. Such a high degree of precision is possible because all components that are deflected about living hinges, i.e. components 28, 34, 36, 56, 58 and 60, are all rigidly attached, as by machining the entire assembly from a single piece of stock, thus completely eliminating any lash between the respective components. While the connections between components as described is rigid with respect to lash, such connections are also flexible in a living hinge context. It is also emphasized that very small deflections of the various living hinges is all that is required to test dial indicators, meaning that metal fatigue and breakage should not be a problem. For instance, GIVE EXAMPLE OF LENGTH OF ARM, DIMENSIONS OF MOVABLE FRAME AND DEGREE OF MOVEMENT.

While the present invention is discussed with respect to the embodiment as shown in FIGS. 1, 1a and 2, other embodiments are possible. For instance, hinge assembly 44 may be located at an upper end of side support member 28 and attached to upper support 14. In addition, while four weakened areas are shown in hinge assembly 44, a similar hinge may be constructed using only one weakened area above and one weakened area below center hinge member 56. Further, in another embodiment, upper and lower members 34, 36 may be constructed of a thinner material without resorting to weakened areas that serve as living hinges at the corners. Likewise, hinge assembly 44 may be constructed of a thinner material without resorting to weakened areas. In yet another embodiment, the rack and pinion slide adjustment mechanism may be omitted, with reference gage 78 attached directly to side member 28. In this embodiment, the device may be used to test the resolution of dial indicators or determine whether lash exists in the mechanisms thereof. Such a device may also be used to calibrate the reference gages themselves as a known amount of displacement of displacement arm 62 will produce a known amount of movement of side member 28, particularly when the entire apparatus is used at and equilibrated to a specific temperature. In still another embodiment, hinges or pinned connections having very tight tolerances to minimize lash may be substituted for the living hinges, although such an embodiment would be less accurate than one with living hinges.

Another application of the apparatus of FIG. 1 is as a robotic positioner capable of tiny controlled movements. In this instance, articles may be located or moved by an operable member attached to side 28, in turn moved by displacement of arm 62. In this embodiment, movement may be sensed by strain gages mounted across weakened regions 38, 40, 42, 44. A closed loop control system may be utilized wherein the strain gages are coupled as a balanced bridge circuit to provide feedback indicative of amount of displacement of members 28, 34 and 36. In a variant of this embodiment, a laser may be used to detect displacement of structure 26, this displacement being related to movement of block 70 or a robotic positioning member. Here, as shown in FIG. 2, a laser beam generating device, such as a laser diode 100, may be conventionally generated or focussed to a tight beam angularity directed onto mirrors 102, 104 mounted to inside regions of members 34, 36, respectively. After being reflected between mirrors 102, 104 a multitude of times (only 3 shown for clarity), the beam falls on a CCD or similar laser sensor 106. In this embodiment, as displacement of members 34, 36 occurs, the point at which the laser beam impinges on sensor 106 shifts, this shift indicative of degree of displacement of members 34, 36 and member 28. Sensitivity of this shift should be determined by the number of times (and thus distance the beam travels) the beam bounces between mirrors 102, 104. Alternately, the laser beam may be bounced between three sides of structure 26 in order to determine displacement of structure 26. Also, the beam may be bounced from at least one mirror mounted to any displacable component of structure 26 (including hinge assembly 44 and arm 62) and detected by a sensor mounted away from apparatus 10. Likewise, the laser may be mounted away from apparatus 10 and positioned to bounce a beam from at least one mirror mounted to a component of structure 26 or hinge assembly 44, including arm 62. Further yet, the laser-generating device may be attached to a one of the movable components and the sensor statically mounted. The key idea of any of these light beam-utilizing embodiments is to detect position of a photonic beam on a sensor and correlate a detected shift of position of the beam on the sensor with a selected degree of vertical movement of intermediate member 28.

Having thus described my invention and the manner of its use, it should be apparent to one skilled in the art that incidental changes may be made thereto that fairly fall within the scope of the following appended claims,

Wherein I claim:

1. A dial indicator calibrating apparatus comprising:
    a frame including a base, said frame further having a mount to which a dial indicator to be calibrated is mounted,
    a selectively movable member having first and second opposed surfaces, and mounted to and moved by a rack and pinion mechanism, said rack and pinion mechanism coupled between said selectively movable member and said frame, with a first distance-measuring plunger of said dial indicator to be calibrated bearing against said first surface,
    a reference indicator mounted to said base and having a second distance-measuring plunger, said second distance measuring plunger bearing against said second surface so that when said selectively movable member is moved, said first distance-measuring plunger and said second distance-measuring plunger are each displaced a like distance and in opposite directions.

2. A dial indicator calibration apparatus as set forth in claim 1 wherein said rack and pinion mechanism is coupled to a second selectively movable member, said second selectively movable member being attached to said frame.

3. A dial indicator calibration apparatus as set forth in claim 2 wherein said second selectively movable member further comprises:
    a deformable structure having three sides, two of said sides hingably attached at one end to said frame and hingably supporting a third side of said sides at opposite ends thereof, said rack and pinion mechanism being attached to said third side,
    an extension of said third side hingably attached to said frame and to said third side,
    a deflector attached at one end to said extension between said frame and said third side, said extension pivoting generally about a point where said deflector is attached, thereby producing movement of said third side.

4. A dial indicator calibrating apparatus as set forth in claim 3 further comprising a force-applying device coupled to an opposite end of said deflector.

5. A dial indicator calibration apparatus as set forth in claim 3 wherein said first, second and third sides and said extension are supported at their respective ends by living hinges.

6. A dial indicator calibration apparatus as set forth in claim 3 wherein said rack and pinion mechanism produces coarse movements and said second selectively movable member produces fine movements.

7. A dial indicator calibration apparatus as set forth in claim 1 wherein said mounting member is removably attached to said base in order to accommodate different configurations of dial indicators.

8. A dial indicator calibrating apparatus as set forth in claim 1 wherein said fixed relationship between said first and second surfaces is a parallel relationship.

9. Calibration apparatus for comparing a reference indicator of high precision with a distance-measuring instrument under test, said calibration apparatus comprising:
    a calibration block having opposed parallel surfaces, with a distance-measuring plunger of said reference indicator bearing against one of said surfaces and a distance-measuring plunger of said instrument under test bearing against the other of said surfaces,
    a first, rigid frame supporting both said reference indicator and said distance-measuring instrument under test and further comprising:
        an upper support member to which said distance-measuring instrument is coupled,
        a base,
        a first intermediate support member between said upper member and said base,
    a second, deformable frame further comprising:
        upper and lower support members each flexibly attached at one end to said first intermediate support member and extending perpendicularly therefrom,
        a second intermediate support member flexibly coupled between the other ends of said upper and lower support members, said calibration block coupled to said second intermediate support member,
        a deformable member coupled between one end of said intermediate support member and said rigid frame,
        an arm attached at one end to said deformable member and extending generally perpendicular therefrom,
        a force-applying device coupled to an opposite end of said arm and attached to said first frame,
        whereby force applied from said force-applying device to said arm displaces said arm, deforming said deformable member and moving said second intermediate support member and said calibration block.

10. Calibration apparatus as set forth in claim 9 wherein said upper support member is removable in order to accommodate differently configured distance-measuring instruments.

11. Calibration apparatus as set forth in claim 10 wherein said upper and lower support members, said intermediate support member and said deformable member are connected by living hinges.

12. Calibration apparatus as set forth in claim 9 wherein said deformable member further comprises an upper hinge member coupled to said deformable frame, an intermediate member coupled to said upper hinge member and to which said arm is attached, and a lower hinge member coupled between said intermediate member and said rigid frame.

13. Calibration apparatus as set forth in claim 9 wherein said arm extends through said intermediate support member to said force-applying device.

14. Calibration apparatus as set forth in claim 9 further comprising:

a light beam generating device, at least one beam-reflecting device attached to at least one of said upper and lower support members, said second intermediate support member, said deformable member and said arm, with a beam from said light beam generating device directed on said beam-reflecting device, a light beam position sensor mounted to receive a reflected light beam from said beam-reflecting device, whereby when said second deformable frame is deformed, a position of said light beam falling on said light beam position sensor is moved.

15. Calibration apparatus as set forth in claim 14 wherein said light beam-generating device is mounted to said first frame and said light beam position sensor is mounted to said second, deformable frame.

* * * * *